NON-DESTRUCTIVE READOUT MEMORY ELEMENT HAVING DUAL APERTURES

Filed Jan. 30, 1967

INVENTOR.
JOHN A. BALDWIN JR.

BY Robert G Rogers

ATTORNEY

United States Patent Office 3,500,355

Patented Mar. 10, 1970

3,500,355

NON-DESTRUCTIVE READOUT MEMORY ELEMENT HAVING DUAL APERTURES

John A. Baldwin, Jr., Santa Barbara, Calif., assignor to North American Rockwell Corporation, a corporation of Delaware Filed Jan. 30, 1967, Ser. No. 612,476

Int. Cl. G11c *11/08*

U.S. Cl. 340—174 1 Claim

ABSTRACT OF THE DISCLOSURE

A non-destructive readout element having two conductors passing through two apertures in such a manner that when writing the flux produced by current passing through the conductors aids each other in the magnetic material surrounding one aperture and opposes each other in the magnetic material surrounding the other aperture. Before each writing, the core is cleared. Non-destructive reading is achieved by passing a current through the apertures in the same manner as the writing pulse with the stored bit being sensed on the other line in the form of a bipolar spike. The magnetic orientation of the core remains unchanged after an interrogation period.

BACKGROUND OF THE INVENTION

Field of the invention

This invention relates to a two-hole non-destructive readout (NDRO) memory element and, more particularly, to such an element and process for writing and reading with only two conductors in such a manner that the core is cleared before every writing and remains magnetized with the same orientation after every reading.

Description of prior art

Although Patent No. 2,685,653 to L. W. Orr et al., for a Gating Circuit, teaches and shows a two-hole device, it does not teach or show a two-hole non-destructive readout element. He teaches an input pulse generator for applying pulses to an input winding wound about the central leg of a two-hole element for producing equal magnetic flux change in the two outer loop portions if the gating means is not energized. Unequal flux changes are produced in the two outer loop portions to produce an output when the gating means is energized.

R. L. Thompson, Patent No. 2,519,513 for a Binary Counting Circuit, also teaches two-hole devices connected as a binary counter. One device is in a saturated condition and the other device is in an unsaturated condition. Current is applied to saturate the unsaturated device while taking the saturated device out of saturation. Output windings are produced to sense the change in saturation as a binary count. The device does not teach or show a two-hole, non-destructive readout element.

The closest art appears to be contained in an IBM Technical Disclosure Bulletin, volume 5, No. 12, May 1963, pages 50 and 51, written by G. D. Bruce for a Magnetic Storage Device. In the bulletin, a two-hole device is shown and described as having three windings inserted through the openings such that flux produced by one winding controls the flux in the central branch while the other windings control the flux in the outer branches. A current is applied in an opposite direction to one of the windings for interrogating the element. A central winding is provided for detecting a change in flux due to the interrogation pulse. Although it is not believed necessary to use a central winding for detecting a change in flux, the primary disadvantage or shortcoming of the IBM structure is that no means is taught for achieving non-destructive readout. By applying the interrogation pulse in the opposite direction of that of the writing pulse, the magnetic orientation is changed and in order to retain the stored information, a new writing cycle must be completed before processing can continue.

A system should be provided wherein threaded conductors are reduced to a minimum number and wherein the conductors and the means for driving the conductors provides non-destructive readout. An improved system should decrease the writing and reading process by providing a means for interrogating the element without interfering with the magnetic orientation of the element. Means should be provided for clearing the element to zero at the beginning of each writing cycle so that information can be properly written into the element without interference from previously written information.

SUMMARY OF THE INVENTION

Briefly, the invention comprises a non-destructive readout element and a process for obtaining non-destructive readouts. The memory element comprises a dual aperture having a first winding threaded through both openings in the opposite direction and a second winding threaded through the openings in the same direction.

Pulses are provided to the first conductor for clearing the magnetic element before writing and for writing information into the element. In addition, pulses are provided in the first conductor for interrogating the element after information has been written therein. The writing and interrogation pulses have the same polarity. The clear pulse has a polarity which is opposite to that of the interrogation pulse.

A pulse is passed through the second conductor simultaneous with a write pulse through the first conductor after an element has been cleared to complete the writing. Current in the second conductor may be of either polarity depending on whether a one or a zero is being written into the element. However, current through the first conductor for writing is always of the same polarity.

When the interrogation pulses are passed through the first conductor, a bipolar output signal is detected on the second conductor. The second conductor is used in both the writing and sensing operations.

Therefore, it is an object of this invention to provide a dual apertured non-destructive readout element and a process for achieving non-destructive readout using the element.

It is a further object of this invention to provide a device having dual apertures using two conductors for clearing, writing and interrogating information stored in the element.

Still a further object of this invention is to provide a process for initially clearing an element before writing and interrogating the element wherein only two conductors are used.

A still further object of this invention is to provide non-destructive readout of a dual apertured memory element wherein interrogation pulses have the same polarity as write pulses on one of the conductors threaded through the element.

Still a further object of this invention is to provide a process for clearing a dual apertured non-destructive readout element by writing information into the element and interrogating the element in a manner to provide for non-destructive readout.

These and other objects of this invention will become more apparent in connection with the following drawings.

DESCRIPTION OF THE PREFERRED EMBODIMENTS

Figure 1:
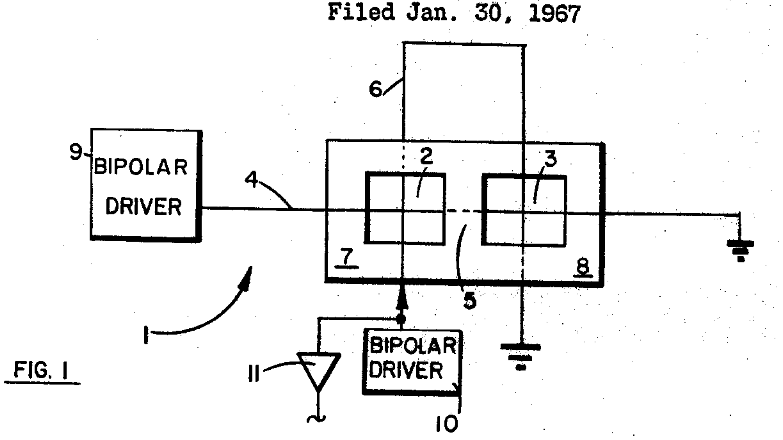
FIGURE 1 illustrates one embodiment of a dual apertured non-destructive readout element having first and second conductors threaded through the apertures.

Referring now to FIGURE 1, wherein is shown magnetic element 1 comprising apertures 2 and 3. The apertures are shown as having branches 5, 7 and 8 of equal cross-sectional areas. Conductor 4 is threaded through apertures 2 and 3 respectively, in opposite directions. Conductor 6 is threaded through apertures 2 and 3 of the element in the same direction. Conductor 4 is connected between ground and bipolar driver means 9. Conductor 6 is also connected between ground, bipolar driver means 10, and amplifier means 11.

Bipolar driver 9 may be comprised of a standard flip flop or other circuits having a capability for generating digital signals with positive and negative magnitudes. Driver 10 may be comprised of a similar flip flop or other circuits for generating signals having positive and negative magnitudes. For purposes of this description, a binary one is assumed to be represented by a signal having positive magnitude while a binary zero is assumed to be represented by a signal having a negative magnitude.

Amplifier 11 may be comprised of a standard amplifier having a capability for amplifying low magnitude signals within the frequency range of the signals produced by the bipolar drivers. Although both drivers are shown connected through the conductors to ground, it should be obvious that the ground level may be another reference level if it is desired to provide a bias for the magnetic element.

Figure 2:
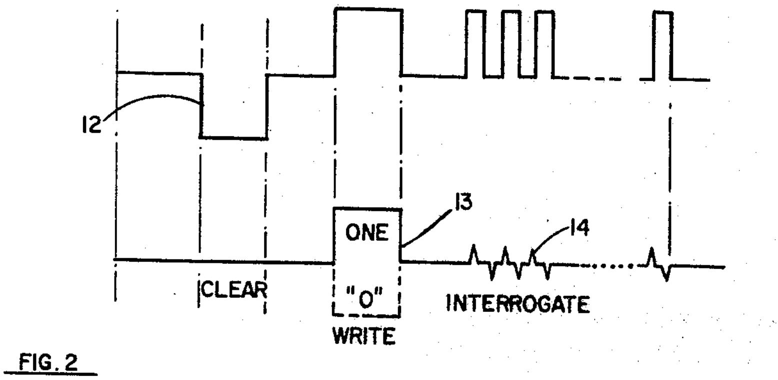
FIGURE 2 illustrates wave forms used in clearing, writing and interrogating the dual apertured element.

Referring now to FIGURE 2, wherein is shown a representation of signal 12 from bipolar driver 9 and a representation of signal 13 from bipolar driver 10. Signal 12 shows input signal 14 to amplifier 11. The input signal is shown as comprising a series of bipolar spiked pulses. The spiked signal corresponds to a binary one stored in the element. If a binary zero has been stored, the polarity of the signal would have been reversed. Detector means well known to those skilled in the art could be provided for determining the polarity. The operational cycle illustrated is divided into a clear period wherein the binary element is cleared, and a writing period wherein binary information is written into the element and stored. The final portion of the cycle comprises an interrogate period wherein bipolar driver 9 provides an interrogation pulse for interrogating or sensing the magnetic state of the element.

Figure 3A:
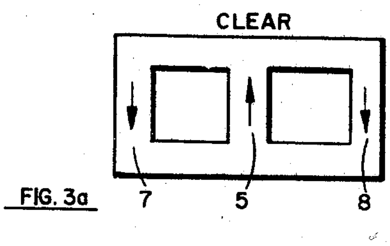
FIGURES 3*a*, 3*b* and 3*c* illustrate representations of three possible flux patterns which may be generated by the conductors threaded through the apertures.

As shown in FIGURE 2, and FIGURE 3*a*, bipolar driver 9 generates a negative pulse so that the flux in branches 7 and 8 are in parallel and flux through central branch 5 is directed upward. As will be seen in connection with the other portions of FIGURE 3, regardless of the previous state of the stored information, a negative pulse through conductor 4 clears the magnetic element. During a clear operation, bipolar driver 10 is turned off.

Figure 3B:
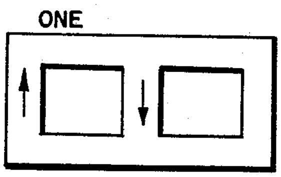

As shown in FIGURE 3*b*, if it is desired to write a logical "one" into the magnetic element, bipolar 10 generates a positive signal and bipolar driver 9 similarly generates a positive going signal. As a result, flux in the central loop is down, flux from the left branch is up. No flux is provided in branch 8. By definition, the magnetic material surrounding aperture 2 can be described as having a magnetic orientation of a binary 1.

Figure 3C:
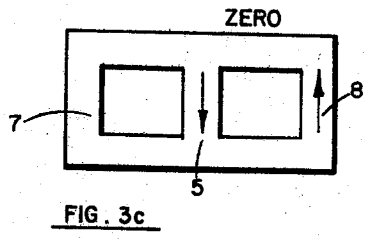

As shown in FIGURE 3*c*, if it had been desired to write a "zero" into the magnetic element, the polarity of the pulse from binary driver 9 would not have changed. It would still have been a pulse having a positive magnitude. The pulse from bipolar driver 10 would have been negative so that branch 7 would not have been magnetized but branch 8 would have been magnetized. In both cases, the signal from bipolar driver 9 is positive. The binary "one" or "zero" writing is controlled by the polarity of the signal on conductor 6.

As a result, regardless of whether a one or a zero is written into the magnetic element during a clear operation, flux upward in the central branch and downward in the outer branch, erases either a "one" or a "zero." The flux pattern for a clear operation is shown in FIGURE 3*a*.

Following a writing operation, if it is desired to interrogate the element to determine whether or not a binary one or zero is stored therein, a positive going pulse is generated by bipolar driver 9. The frequency of the interrogation signal does not have to be the same as the frequency of the write pulses. The positive pulses tend to magnetize the central branch downward. However, since this branch is already magnetized down in both the one and zero states, interrogate pulses do no more than shuttle the flux of the core. The output voltage is from conductor 6 and provides as an input to amplifier 11. As shown in FIGURE 2, the output voltage is in the form of a spike signal having positive and negative going pulses corresponding to the positive and negative going edges of the pulse generated by binary bipolar driver 9.

Although the invention has been described and illustrated in detail, it is to be understood that the same is by way of illustration and example only, and is not to be taken by way of limitation; the spirit and scope of this invention being limited only by the terms of the appended claim.

I claim:

1. The process for reading information from a dual apertured magnetic element having a first conductor threaded through the apertures in opposite directions and a second conductor threaded through the apertures in the same direction comprising the steps of,
   - first generating a clearing pulse on the first of said conductors which establishes a flux in a first direction in the center leg for erasing any previous stored information,
   - second generating pulses on the first and second conductors for writing information into said magnetic element, with the pulse on said first conductor having a polarity opposite of the polarity of the clear pulse, which establishes a flux in a second direction in the center leg said pulse on the second conductor having a polarity for controlling which of two magnetic states are stored in said magnetic element,
   - third generating pulses generating an interrogation pulse on the first conductor having a polarity equal to the polarity of the write pulse which establishes a flux in said second direction in the center leg for interrogating the state of the information stored in said magnetic element,
   - detecting a bipolar spaked output signal on said second conductor in response to said interrogation pulse, said output signal having alternating changes in polarity which are representative of the state of the magnetization of the element.

References Cited

UNITED STATES PATENTS 3,213,435 10/1965 Bruce ------------- 340—174

JAMES W. MOFFITT, Primary Examiner